(12) United States Patent
Sheinin et al.

(10) Patent No.: US 8,103,048 B2
(45) Date of Patent: Jan. 24, 2012

(54) DETECTION OF SPAM IMAGES

(75) Inventors: Michael Sheinin, Waterloo (CA); Rob Targosz, Waterloo (CA)

(73) Assignee: McAfee, Inc., Santa Clara, CA (US)

( * ) Notice: Subject to any disclaimer, the term of this patent is extended or adjusted under 35 U.S.C. 154(b) by 891 days.

(21) Appl. No.: 11/987,728

(22) Filed: Dec. 4, 2007

(65) Prior Publication Data

US 2009/0141985 A1     Jun. 4, 2009

(51) Int. Cl.
*G06K 9/00* (2006.01)
(52) U.S. Cl. .................. 382/100; 382/176; 382/199
(58) Field of Classification Search .................. 382/100, 382/199, 173, 176
See application file for complete search history.

(56) References Cited

U.S. PATENT DOCUMENTS 7,031,553 B2 * 4/2006 Myers et al. .................. 382/289
2005/0216564 A1 * 9/2005 Myers et al. .................. 709/206

OTHER PUBLICATIONS

Issac et al. "Spam Detection Proposal in Regular and Text-based Image Emails." IEEE Region 10 Conference, Nov. 14, 2006, 4 pages.*

* cited by examiner

*Primary Examiner* — Jon Chang
(74) *Attorney, Agent, or Firm* — Patent Capital Group (57) ABSTRACT

A method, system, and computer program product for analyzing image attachments to email messages and reliably determines whether the image includes spam, so that the message can be blocked. A method for processing email messages comprises processing an image included in or attached to an email message to determine whether the image includes features that indicate whether the image is spam and determining whether the image is spam based on the included features that indicate whether the image is spam.

27 Claims, 10 Drawing Sheets

ORIGINAL IMAGE

Fig. 3b

B/W IMAGE

Fig. 3c

LINE DETECTION

Fig. 3d

HORIZONTAL EDGE DETECTION

Fig. 3e

VERTICAL EDGE DETECTION

DETECTION OF SPAM IMAGES

BACKGROUND OF THE INVENTION

1. Field of the Invention

The present invention relates to scanning images included in emails to determine whether those images include undesired textual content.

2. Description of the Related Art

The prevalence of unsolicited commercial email, commonly known as spam has grown rapidly and still growing. The corporate world and individual home users are spending millions of dollars to combat spam. Internet Service Providers (ISPs) have to cope with greatly increasing day-to-day amounts of network traffic due to the increase in spam emails. If spam traffic continues to grow, it may become unmanageable in the near future.

Typically, spam has been fought by the use of software that scans incoming email messages to determine whether each message is spam. Typical methods for scanning and detecting that an email message is spam include email filtering based on the content of the email, DNS-based blackhole lists (DNSBL), greylisting, spamtraps, enforcing technical requirements, checksumming systems to detect bulk email, and by putting some sort of cost on the sender via a Proof-of-work system or a micropayment.

Detecting spam based on the content of the email, either by detecting keywords or by statistical means, is very popular. Such methods can be very accurate when they are correctly tuned. As a result, spammers have resorted to other techniques for sending spam. One such technique is termed "image spam". In image spam, the text of the message is stored as an image, such as a GIF or JPEG image, and displayed in the email or attached to the email. This prevents text-based spam scanners from detecting and blocking spam messages.

Often, image spam contains nonsensical, computer-generated text which simply annoys the reader. However, a significant percentage of the spam email contains images that actually provide the core meaning of a message. Those images are frequently embedded into the HTML part of the MIME message, being actually a MIME attachment, making it appear as an integral part of the content. In some cases the images are the only attachments in the otherwise blank messages. Either way, these images impose a serious challenge for spam blocking software based on content analysis. Some spam filters currently block any messages containing embedded images. While such filters eliminate image spam, they also block legitimate email having embedded images, such as signatures and logos. Some spam filters use optical character recognition (OCR) technology to attempt to find the text in images attached to email messages. However, OCR techniques are time consuming and inaccurate, missing some spam and blocking some legitimate messages.

A need arises for a technique for analyzing image attachments to email messages and reliably determining whether the image includes spam, so that the message can be blocked.

SUMMARY OF THE INVENTION

A method, system, and computer program product for analyzing image attachments to email messages and reliably determines whether the image includes spam, so that the message can be blocked. The described technique provides improved detection reliability and reduced computational costs compared to prior detection schemes. In addition, the described technique is language and character set independent.

A method for processing email messages comprises processing an image included in or attached to an email message to determine whether the image includes features that indicate whether the image is spam and determining whether the image is spam based on the included features that indicate whether the image is spam. The processing may be performed by converting the image to have only luminance information, detecting contiguous horizontal regions with distinctive luminance, and detecting horizontal and vertical edges of the contiguous horizontal regions as the features that indicate whether the image is spam. The determining may be performed by determining whether the image is spam based on a ratio of a number of horizontal edges to a number of vertical edges. The determining may be performed by determining that the image is spam when the ratio of a number of horizontal edges to a number of vertical edges is greater than a threshold value. The threshold value may be included in a range of approximately 10 to 15.

The contiguous horizontal regions with distinctive luminance may be detected by performing horizontal smoothening on the image and performing segmentation of the image. The horizontal smoothening may be performed by combining multiple pixels by setting each of the combined pixels to an average value of the combined pixels The segmentation of the image may be performed by computing an average luminance value of the image, dividing each horizontal line in the image into a plurality of equal segments, and for each segment of each horizontal line in the image determining an average and minimum luminance value of the segment and marking each pixel of the segment as belonging to a foreground or belonging to a background. The determining an average and minimum luminance value of the segment may be performed by determining that the background is brighter than a content when the average luminance value of the segment is greater than a threshold value and that the background is darker than the content when the average luminance value is less than or equal to the threshold value, setting a value to be used to mark a segment as belonging to the background to black and a value to be used to mark a segment as belonging to a foreground to white when the background is brighter than the content, and setting a value to be used to mark a segment as belonging to the background to white and a value to be used to mark a segment as belonging to a foreground to black when the background is darker than the content. The marking each pixel of the segment as belonging to a foreground or belonging to a background may be performed by marking all pixels of the segment as belonging to the background when the average and minimum luminance values of the segment are equal, marking the pixel as belonging to the background when the luminance of the pixel is greater than the average luminance of the segment, and marking the pixel as belonging to the fore when the luminance of the pixel is less than or equal to the average luminance of the segment.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method, system, and computer program product for scanning images included in or attached to emails provides reliable detection of spam included in such images, but reduces the computing resources needed for such detection. The technique utilizes the fact that most of the images attached to the spam messages carry textual information rather than pictures or any other type of graphical content. In addition, the technique is language and character set independent, that is, text that is written horizontally of any language and any character set may be detected without increasing the computing resources needed for such detection.

Figure 1:
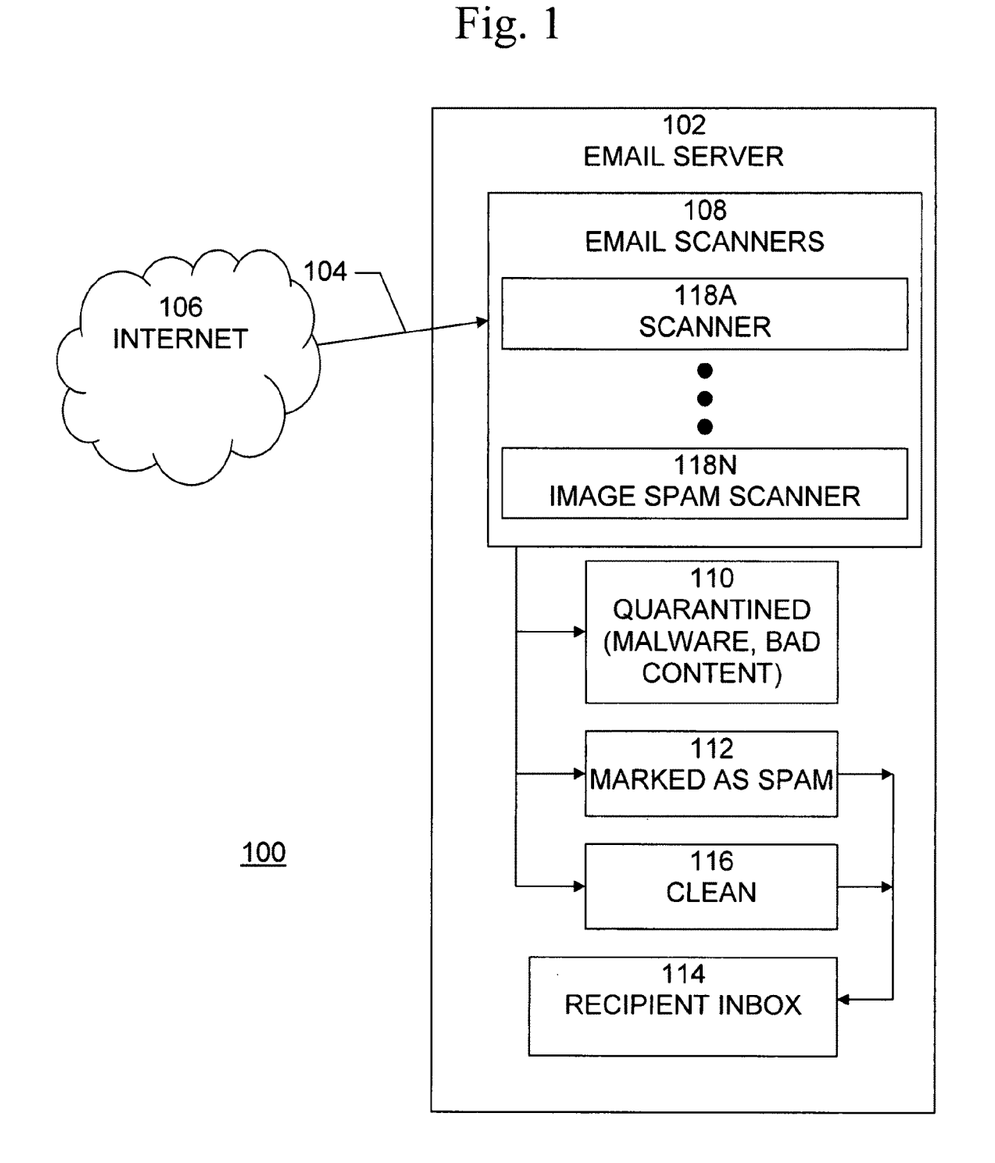
FIG. 1 is an exemplary block diagram of a system in which the present invention may be implemented.

A block diagram of a system 100 in which the present invention may be implemented is shown in FIG. 1. Email server 102 receives email messages 104 via the Internet 106, or other network. The email messages are processed by email scanner 108. Email scanner 108 automates the highlighting, removal or filtering of email spam, malware, and/or bad content by scanning through incoming and outgoing emails in search of traits typical of such undesirable items. Such scanning may include searching for patterns in the headers or bodies of messages. Each incoming email message is scanned to determine whether it is a dangerous spam email message, including malware or bad content, which is to be quarantined 110, a spam email message that is to be marked as SPAM 112 and delivered to the recipients inbox 114, or a clean email message 116 that is to be delivered as is to the recipient's inbox 114. Email scanners 108 include a plurality of scanners 118A-N, each of which is capable of scanning one or more different item types and scanning for one or more types of undesirable content. A scanner is a component that can run against an item to determine whether or not it has undesirable content, such as AntiVirus, AntiSpam, bad content, and other scanners. For example, scanners 118A-N include image spam scanner 118N, which determines whether image files included in or attached to received email messages include spam.

Figure 2:
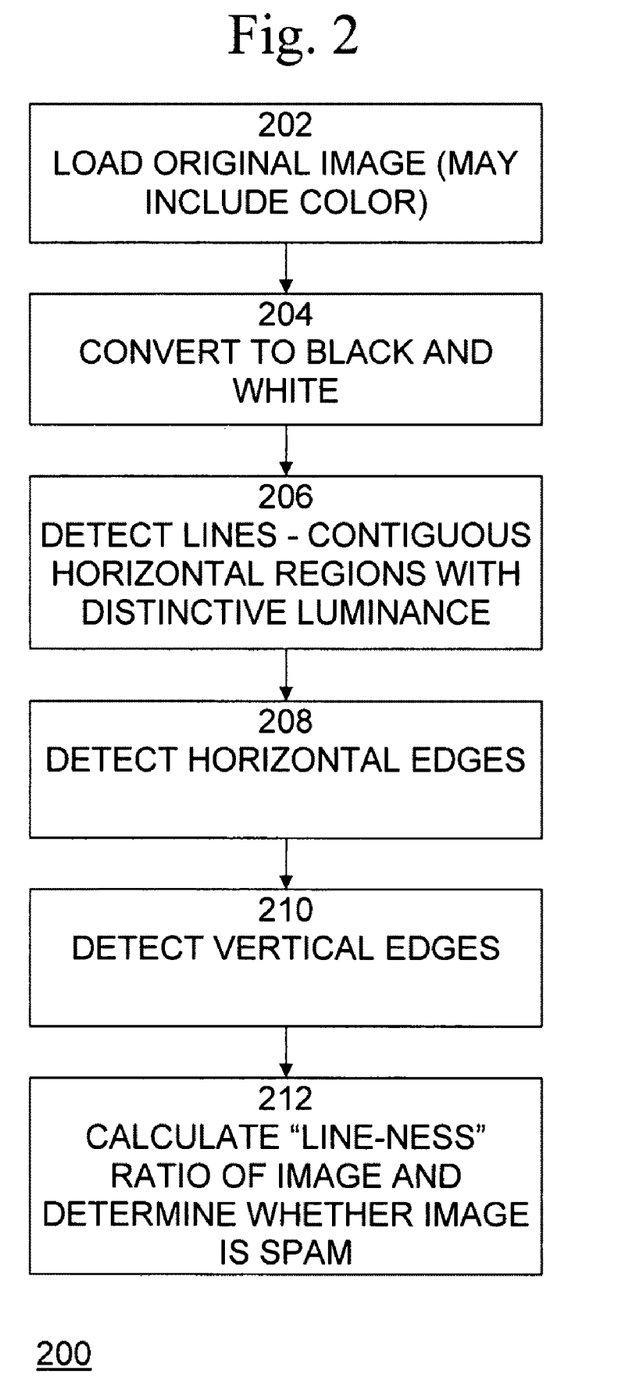
FIG. 2 is an exemplary flow diagram of a process of operation of an image spam scanner, according to the present invention.
Figure 3A:
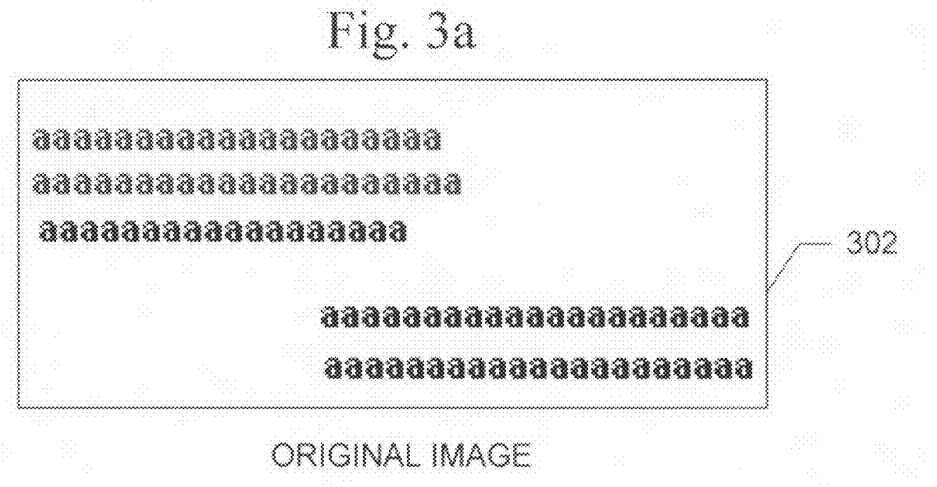
FIG. 3a is an exemplary illustration of an original image including text.

An example of a process of operation 200 of an image spam scanner, such as image spam scanner 118N, is shown in FIG. 2. It is best viewed in conjunction with FIGS. 3a-e, which illustrate the results of the processing steps. Process 200 begins with step 202, in which an image to be scanned to determine whether it includes image spam is loaded. Typically, the image is included in or attached to an email, but the present invention contemplates and is applicable to images obtained from any source. An example of such an original image 302 is shown in FIG. 3a. In image 302, different lines of text are different colors.

Figure 3B:
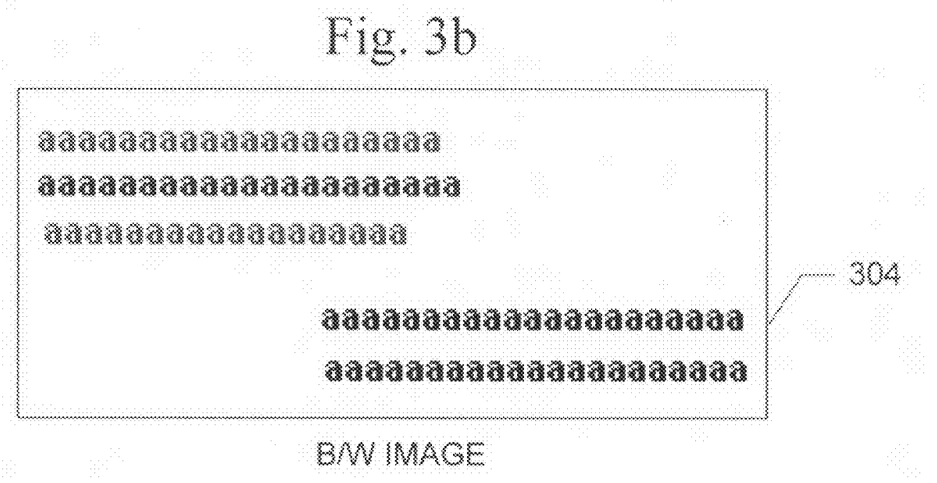
FIG. 3b is an exemplary illustration of a converted image.

In step 204, the image is converted to black and white, that is, luminance information only. An example of a converted image 304 is shown in FIG. 3b. Typically, images found in the e-mail messages as attachments are in JPEG or GIF formats. An image, when read into the memory is typically stored as an array of RGB values –3 bytes per each pixel, one byte for each of red, green, and blue. The resulting array size is 3*width*height of the original image. A common conversion from the RGB color space to YIQ (B/W) is performed as follows:

Luminance=0.3*R+0.59*G+0.11*B.

An alternative conversion formula gives even weights to each color channel:

Luminance=R/3+G/3+B/3

The alternative formula may improve performance with spam images, which often color differently each text line. It is desirable for processing sake that all text lines are expressed evenly on a transformed (B/W) image even though originally they had different colors.

Figure 3C:
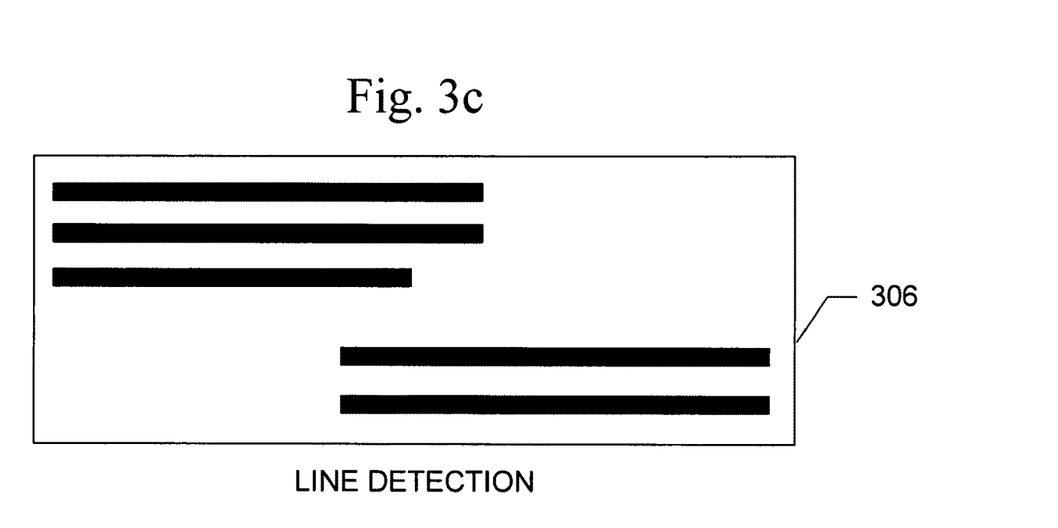
FIG. 3c is an exemplary illustration of line detection.
Figure 3D:
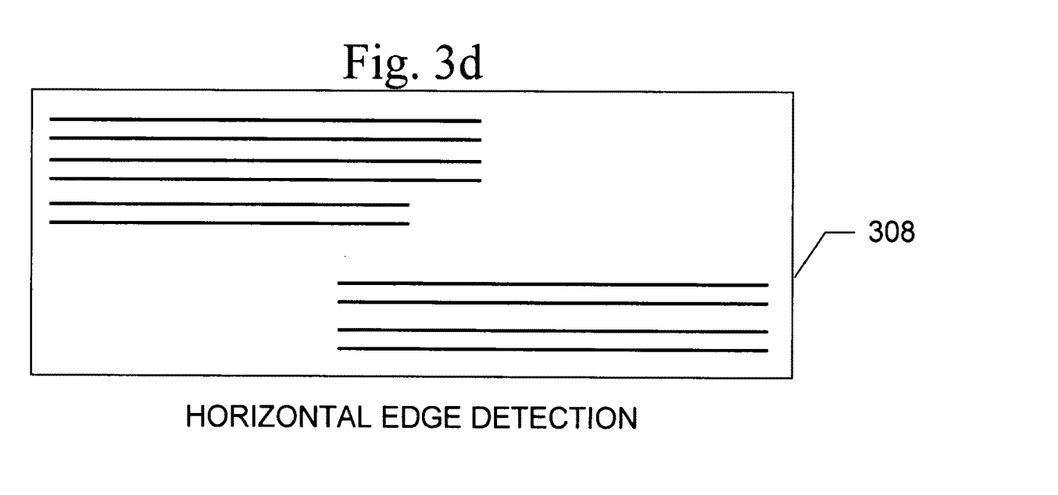
FIG. 3d is an exemplary illustration of horizontal edge detection.
Figure 3E:
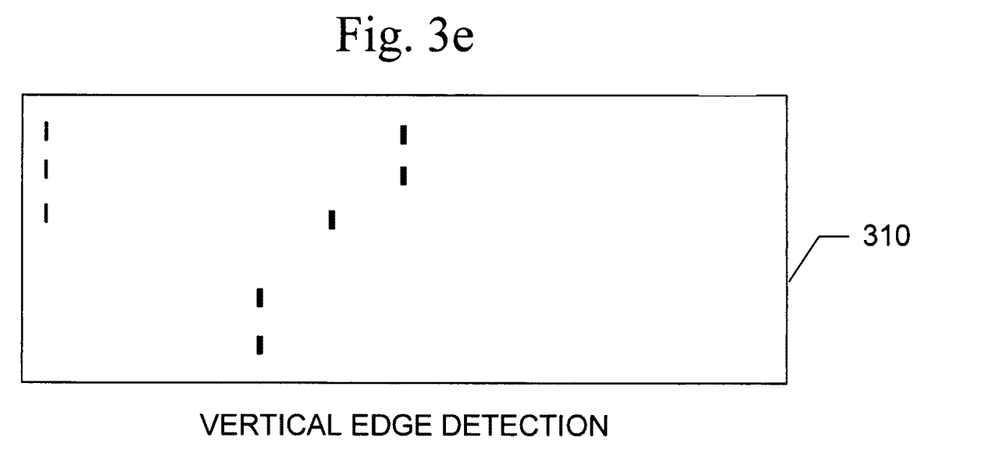
FIG. 3e is an exemplary illustration of vertical edge detection.

In step 206, the lines of text are detected. This is done by detecting contiguous regions of the image that have similar, distinctive luminance. An example of line detection 306 is shown in FIG. 3c. In step 208, the horizontal edges (edges extending horizontally) of the detected lines (contiguous regions) found in step 206 are detected. An example of such horizontal edge detection 308 is shown in FIG. 3d. In step 210, the vertical edges (edges extending vertically) of the detected lines are detected. An example of such vertical edge detection 310 is shown in FIG. 3e. Finally, in step 212, a value that may be termed the "line-ness ratio" is calculated and it is determined whether the image is spam. The line-ness ratio is a ratio between the amount of horizontal and vertical edges. A higher number corresponds to a higher probability of the image being spam.

Figure 4:
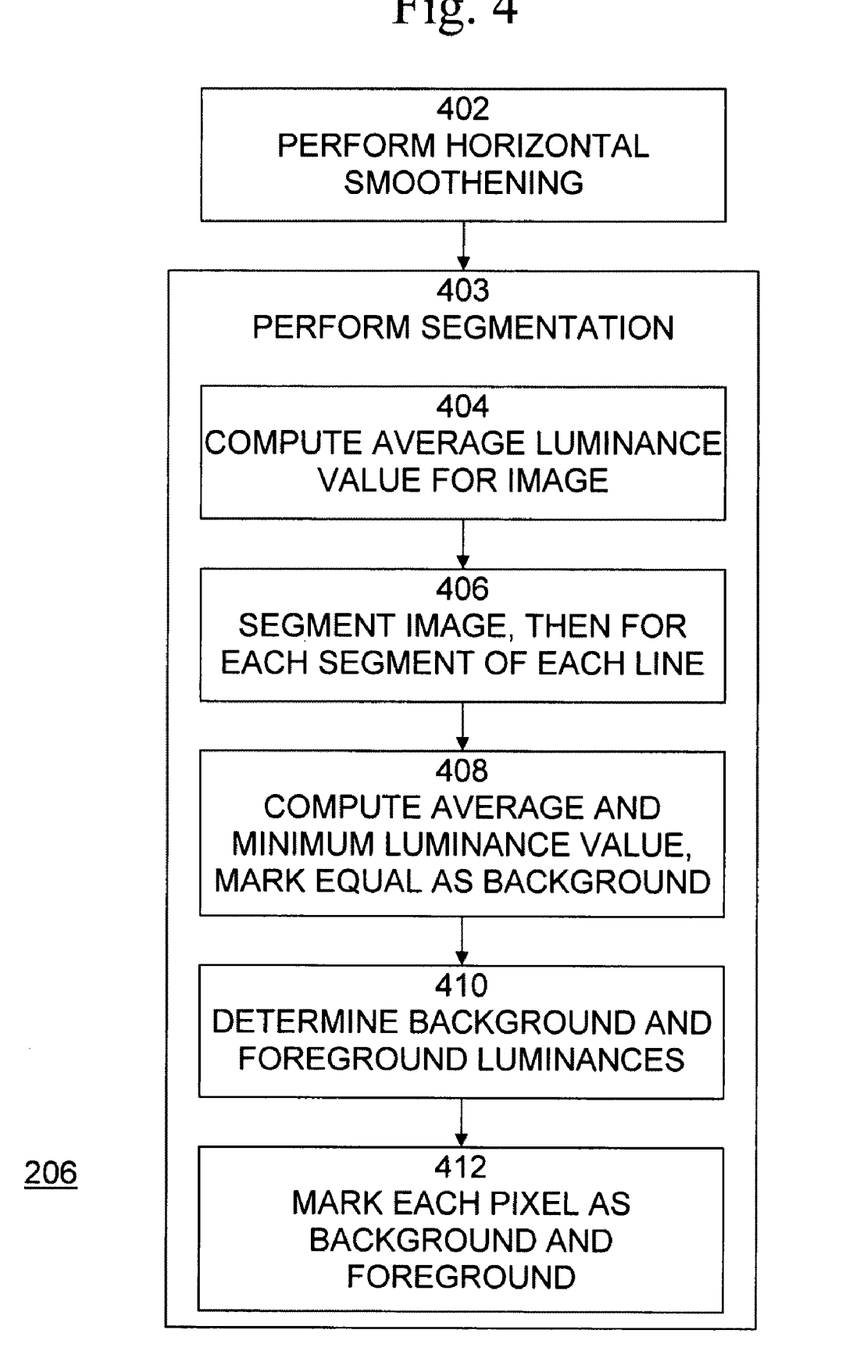
FIG. 4 is an exemplary flow diagram of text line detection.

A more detailed view of the process of text line detection performed in step 206 of FIG. 2 is shown in FIG. 4. The detection of text lines is performed in two major stages: first image is horizontally "smoothened" (step 402) and next, basic image segmentation is performed (step 403). Horizontal smoothening, performed in step 402, is an important stage as it allows elimination of particular image elements (such as noise, glyphs and pictures) and transforming them into shapes. It is also important that the smoothening is performed in horizontal direction only to preserve upper and lower text line boundaries. One example of smoothening is to combine multiple pixels by setting each of the combined pixels to the average value of the combined pixels.

Image segmentation, performed in step 403, is a basic means to isolate content from the image background. Its objective is to produce a monochrome (two-color or luminance) image having a pure white background and a pure black foreground.

Firstly, each horizontal line is divided into a number n of equal segments. Each segment after the processing will be assigned either background (white) or foreground (black) luminance. When all horizontal lines are processed. Each segment is treated as a single pixel. This allows speeding up edge detection because now instead of processing every pixel (in the horizontal direction) the algorithm processes only n "pixels".

The segmentation process begins with step 404, in which an average luminance value for the image is computed. In step 406, the image is segmented horizontally into n equal sized segments. For example, a typical image may be segmented into 10 segments. Then, for each segment of each horizontal line in the image, steps 408-412 are performed in order to mark each segment at belonging to the foreground or the background of the image. Thus, in step 408, for each segment of each horizontal line, the segment's average and minimum luminance values are determined. If the average and minimum luminance values of the segment are equal, the segment is marked as belonging to the background of the image. This may be considered "naïve" protection against "false positives"—solidly colored areas that don't contain text. If the segment is marked as background, then the process proceeds to the next segment. If the segment has not yet been marked, then in step 410, the foreground and background luminances are determined. In particular, if the average luminance value of the segment is greater than a threshold value, then the process assumes that the background is brighter than the content (text). Likewise, if the average luminance value is less than or equal to the threshold value, then the process assumes that the background is darker than the content (text). The values with which the pixels are to be marked as foreground or background in step 412 are set accordingly. For example, if the values to be used for marking are denoted as BG_CLR (for the background) and FG_CLR (for the foreground), then if the background is brighter than the content, BG_CLR is set equal to WHITE (for example, 255) and FG_CLR is set equal to BLACK (for example, 0). Likewise, if the background is darker than the content, BG_CLR is set equal to BLACK (for example, 0) and FG_CLR is set equal to WHITE (for example, 255).

Then, in step 412, each pixel of the segment being processed is marked as foreground or background. Specifically, if the luminance of the pixel is greater than the average luminance determined in step 408, then the pixel is marked as background, BG_CLR. Likewise, if the luminance of the pixels is less than or equal to the average luminance, then the pixel is marked as foreground, FG_CLR. It is to be noted that regardless of the original image background luminance, after processing, the background is always white and the content is always black.

Figure 5A:
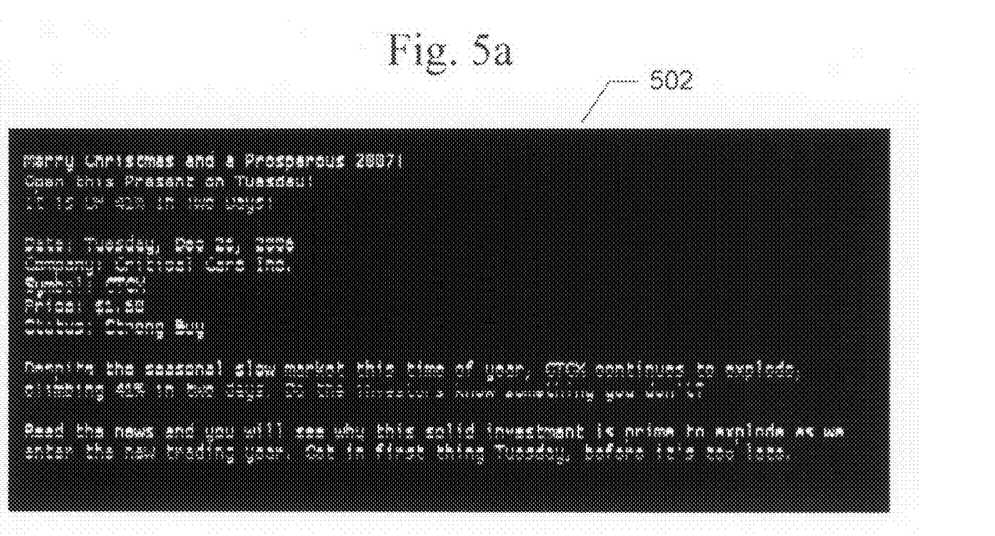
FIG. 5a is an exemplary illustration of an input image.
Figure 5B:
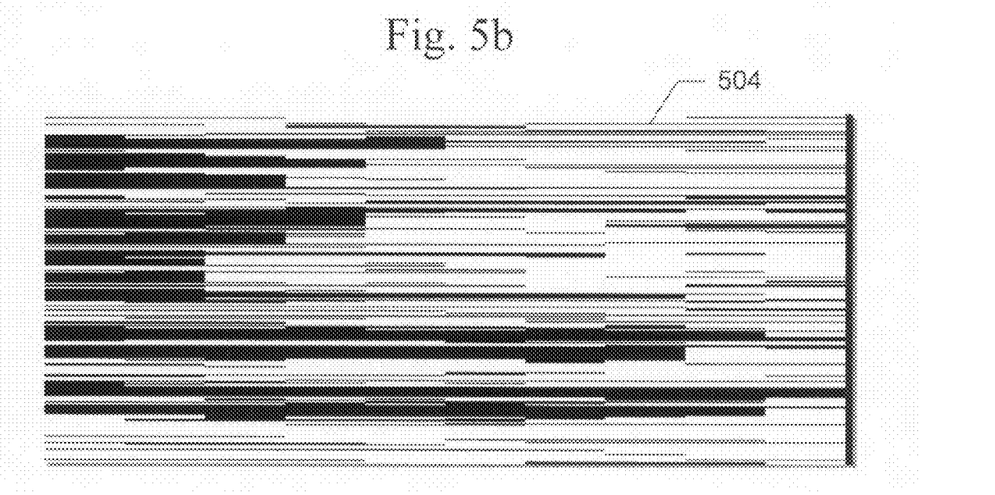
FIG. 5b is an exemplary illustration of an output image.
Figure 5C:
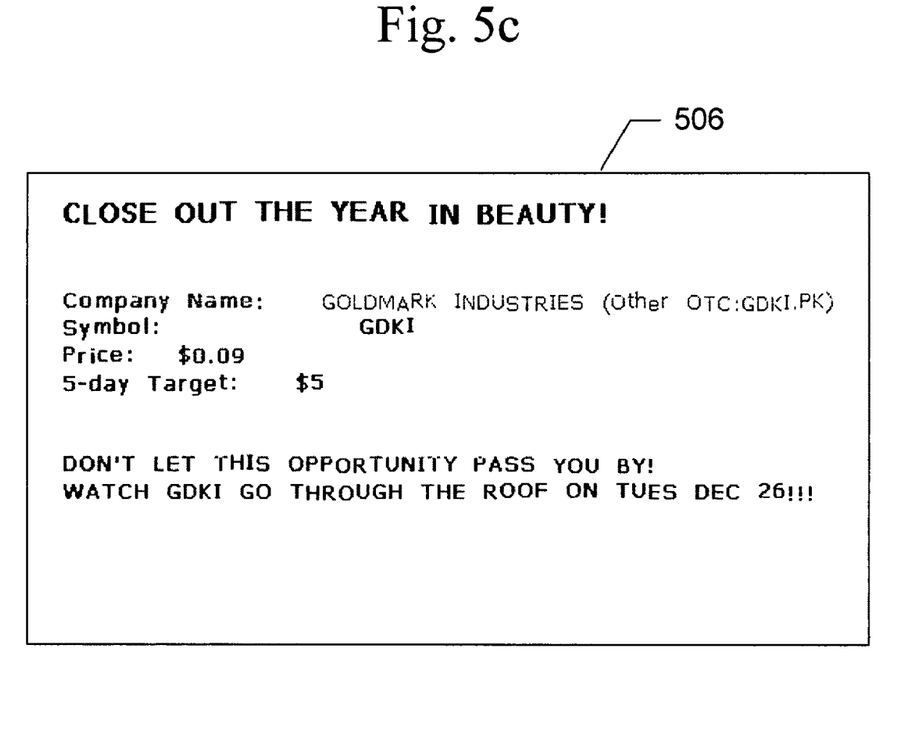
FIG. 5c is an exemplary illustration of an input image.
Figure 5D:
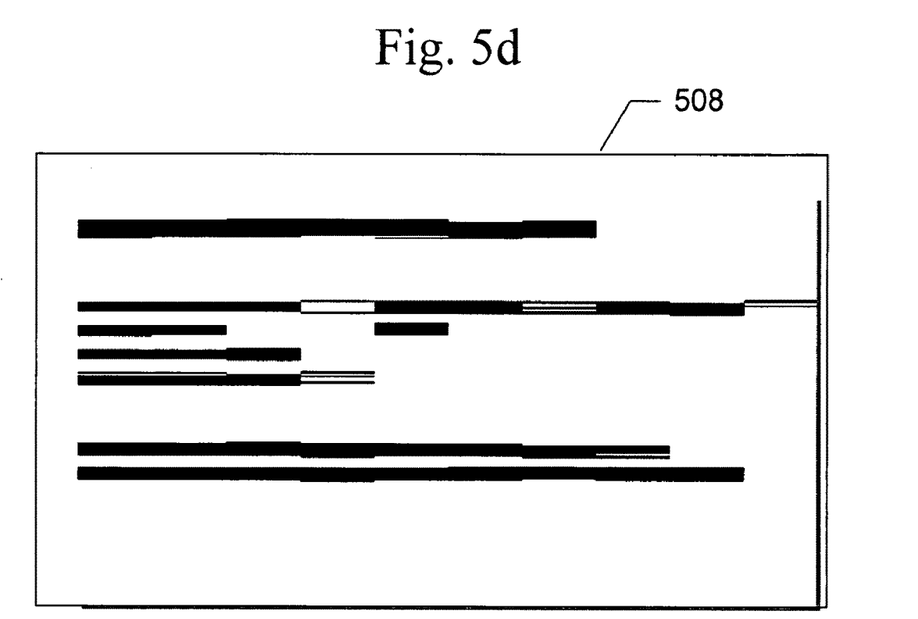
FIG. 5d is an exemplary illustration of an output image.

Examples of input and output images are shown in FIGS. 5a-d. For example, in FIG. 5a, input image 502 has a dark background with lighter text. In processed output image 504, shown in FIG. 5b, the background is white and the content is black. In FIG. 5c, input image 506 has a light background with darker text. In processed output image 508, shown in FIG. 5d, the background is white and the content is black.

The threshold value used in step 410 is typically set to the middle of the luminance range. For example, for a luminance range of black=0 and white=255, the threshold may be set to 128. Alternatively, rather than a simple threshold, an uncertainty window may be used in which all luminance values inside the "uncertainty window" are considered being background (or foreground). For example, the window may be computed as: Low=20*Average/255 High=20*(1−Average/255). In other words, if the color average is 128, the uncertainty window is [128−10, 128+10]. Likewise, if the average is 200, the window is [200−15.7, 200+4.3].

Figure 6:
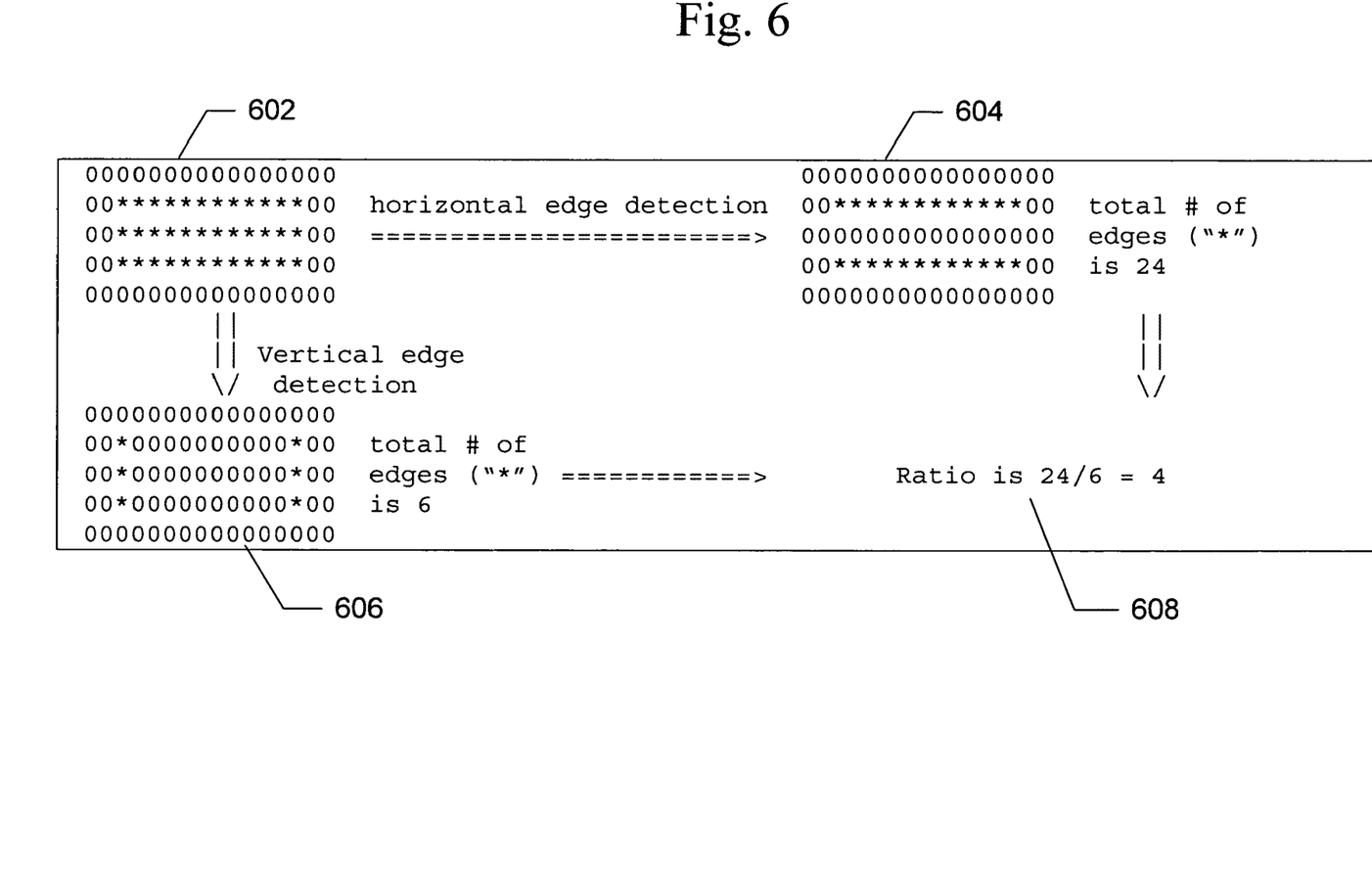
FIG. 6 is an exemplary illustration of a process of line-ness ration computation.

The processing performed in steps 208-212 of FIG. 2 is shown in greater detail in FIG. 6. In steps 208-212 of FIG. 2, the horizontal and vertical edges present in the image are detected and then the "line-ness" ratio (amount of lines vs. amount of other shapes) is computed using the detected horizontal and vertical edges. The horizontal and vertical edges are detected using the processed output image described above, in which the background is always white and the content is always black. This image has been processed to improve edge detection processing. Once the horizontal and vertical edges have been detected the number of horizontal edges and the number of vertical edges are counted. The desired value is a ratio between the number of horizontal edges and the number of vertical edges.

An example of this processing is shown in FIG. 6. In this example, a luminance distribution 602 is shown ("0" represents white pixels and "*" represents black). Both horizontal and vertical edge detection are performed by detecting transitions from white to black and from black to white in the processed output image. Horizontal edge detection 604 is performed and the total number of horizontal edges are counted (in this example there are 24 horizontal edges). Vertical edge detection 606 is performed and the total number of vertical edges are counted (in this example there are 6 vertical edges). The line-ness ratio is computed as the ratio of the number of horizontal edges divided by the number of vertical edges (in this example the ratio is 4). As can be seen from the example, the longer (in horizontal direction) a shape is, the higher the ratio becomes. Thus, the higher the line-ness ratio of an image, the more likely it is that the image includes text.

The determination of whether an image is spam (includes text) is generally based on the computed line-ness ratio. It is difficult to theoretically establish a threshold for the line-ness ratio at which a shape is determined to be text. However, experimental results indicate that a value between 10 and 15 generally works well. In addition to the line-ness ratio, additional factors may be considered in determining whether an image is spam. For example, the image analysis software used may be unable to open a particular image that is attached to an email message. Such invalid images attached to email messages may be invalid because they are damaged, corrupted, incorrectly formatted, etc. Experimental processing indicates that invalid messages are more likely than not to include spam. Therefore, one enhancement is to categorize invalid message as spam a priori. Another way to deal with such messages is to increase a heuristic score indicating the likelihood that the image is spam.

In the case of noisy processed images, such as the exemplary image 504, shown in FIG. 5b, it is desirable to eliminate lines only one pixel in thickness when performing the edge count. Lines one pixel in thickness are unlikely to represent text, and so are not included in the edge count. Lines greater than one pixel in thickness are more likely to represent text, and so are included in the edge count. On the other hand, it has been experimentally found that images that include many one pixel lines are more likely to include spam. Therefore, an enhancement is to count one pixel lines and increase a heuristic score indicating the likelihood that the image is spam.

Figure 7:
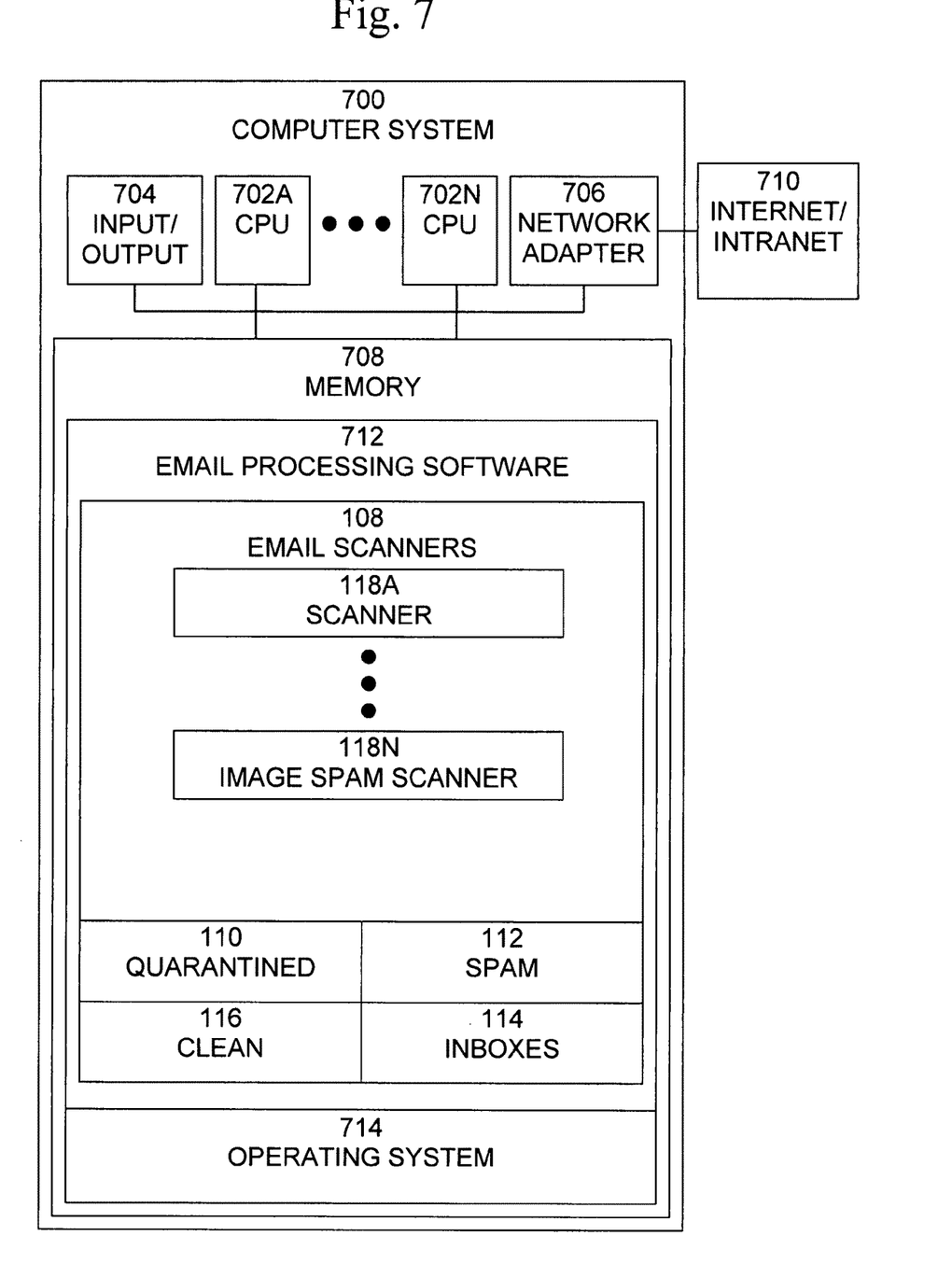
FIG. 7 is an exemplary block diagram of a computer system, such as an email server, in which the present invention may be implemented.

An exemplary block diagram of a computer system 700, such as an email server, in which the present invention may be implemented, is shown in FIG. 7. Computer system 700 is typically a programmed general-purpose computer system, such as a personal computer, workstation, server system, and minicomputer or mainframe computer. Computer system 700 includes one or more processors (CPUs) 702A-702N, input/output circuitry 704, network adapter 706, and memory 708. CPUs 702A-702N execute program instructions in order to carry out the functions of the present invention. Typically, CPUs 702A-702N are one or more microprocessors, such as an INTEL PENTIUM® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present invention also contemplates embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces computer system 700 with Internet/intranet 710. Internet/intranet 710 may include one or more standard local area network (LAN) or wide area network (WAN), such as Ethernet, Token Ring, the Internet, or a private or proprietary LAN/WAN.

Memory 708 stores program instructions that are executed by, and data that are used and processed by, CPU 702 to perform the functions of computer system 700. Memory 708 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 7, memory 708 includes email processing software 712 and operating system 714. Email processing software 712 includes email scanners 108, which include scanners 118A-N, including image spam scanner 118N, quarantined emails 110, spam emails 112, clean emails 116, recipient inboxes 114, and, as well as additional functionality that is not shown. Email scanners 108 automate the highlighting, removal or filtering of email spam by scanning through incoming and outgoing emails in search of traits typical of spam. Such scanning may include searching for patterns in the headers or bodies of messages. Each incoming email message is scanned to determine whether it is a spam email message that is to be marked as SPAM, a dangerous spam email message that is to be quarantined, or a clean email message that is to be delivered as is to the recipient's inbox. In addition, email scanner 108 scans the email address of the sender of the email, and may also scan the first and last name of the sender of the email. Scanners 118A-N scan the items to determine their status. Each incoming email message is scanned to determine whether it is a dangerous spam email message that is to be quarantined 110, a spam email message that is to be marked as SPAM 112 and delivered to the recipient's inbox 114, or a clean email message 116 that is to be delivered as is to the recipient's inbox 114. Image spam scanner 118N scans images included in or attached to email messages to determine whether the image includes spam according to the processed described above. Operating system 714 provides overall system functionality.

As shown in FIG. 7, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. For example, the present invention may be advantageously employed in scanning outgoing email messages, as well as incoming email messages. Accordingly, it is to be understood that the invention is not to be limited by the specific illustrated embodiments, but only by the scope of the appended claims.

What is claimed is:

1. A method, comprising:
   processing an image included in or attached to an email message to determine whether the image includes features that indicate whether the image is spam;
   detecting contiguous horizontal regions associated with the image; and
   detecting horizontal and vertical edges of contiguous regions as the features that indicate whether the image is spam, wherein a ratio of a number of horizontal edges to a number of vertical edges is used, at least in part, to determine whether the image is spam.

2. The method of claim 1, wherein the processing includes:
   converting the image to have luminance information; and
   detecting contiguous horizontal regions with distinctive luminance.

3. The method of claim 2, wherein the contiguous horizontal regions with distinctive luminance are detected by:
   performing horizontal smoothening on the image; and
   performing segmentation of the image.

4. The method of claim 3, wherein the horizontal smoothening is performed by:

combining multiple pixels by setting each of the combined pixels to an average value of the combined pixels.

5. The method of claim 3, wherein the segmentation of the image is performed by:
   computing an average luminance value of the image;
   dividing each horizontal line in the image into a plurality of equal segments; and
   for each segment of each horizontal line in the image:
      determining an average and minimum luminance value of the segment, and
      marking each pixel of the segment as belonging to a foreground or belonging to a background.

6. The method of claim 5, wherein the determining an average and minimum luminance value of the segment are performed by:
   determining that the background is brighter than a content when the average luminance value of the segment is greater than a threshold value and that the background is darker than the content when the average luminance value is less than or equal to the threshold value;
   setting a value to be used to mark a segment as belonging to the background to black and a value to be used to mark a segment as belonging to a foreground to white when the background is brighter than the content; and
   setting a value to be used to mark a segment as belonging to the background to white and a value to be used to mark a segment as belonging to a foreground to black when the background is darker than the content.

7. The method of claim 6, wherein the marking each pixel of the segment as belonging to a foreground or belonging to a background are performed by:
   marking all pixels of the segment as belonging to the background when the average and minimum luminance values of the segment are equal;
   marking the pixel as belonging to the background when the luminance of the pixel is greater than the average luminance of the segment; and
   marking the pixel as belonging to the fore when the luminance of the pixel is less than or equal to the average luminance of the segment.

8. The method of claim 1, wherein the determining includes:
   determining that the image is spam when the ratio of a number of horizontal edges to a number of vertical edges is greater than a threshold value.

9. The method of claim 8, wherein the threshold value is included in a range of approximately 10 to 15.

10. A system comprising:
   a processor operable to execute computer program instructions;
   a memory operable to store computer program instructions executable by the processor; and
   computer program instructions for performing:
      processing an image included in or attached to an email message to determine whether the image includes features that indicate whether the image is spam;
      determining whether the image is spam based on the included features that indicate whether the image is spam; and
      detecting horizontal and vertical edges of contiguous regions as the features that indicate whether the image is spam, wherein a ratio of a number of horizontal edges to a number of vertical edges is used, at least in part, to determine whether the image is spam.

11. The system of claim 10, wherein the processing includes:
   converting the image to have luminance information; and
   detecting contiguous horizontal regions with distinctive luminance.

12. The system of claim 11, wherein the contiguous horizontal regions with distinctive luminance are detected by:
   performing horizontal smoothening on the image; and
   performing segmentation of the image.

13. The system of claim 12, wherein the horizontal smoothening is performed by:
   combining multiple pixels by setting each of the combined pixels to an average value of the combined pixels.

14. The system of claim 12, wherein the segmentation of the image is performed by:
   computing an average luminance value of the image;
   dividing each horizontal line in the image into a plurality of equal segments; and
   for each segment of each horizontal line in the image:
      determining an average and minimum luminance value of the segment, and
      marking each pixel of the segment as belonging to a foreground or belonging to a background.

15. The system of claim 14, wherein the determining an average and minimum luminance value of the segment are performed by:
   determining that the background is brighter than a content when the average luminance value of the segment is greater than a threshold value and that the background is darker than the content when the average luminance value is less than or equal to the threshold value;
   setting a value to be used to mark a segment as belonging to the background to black and a value to be used to mark a segment as belonging to a foreground to white when the background is brighter than the content; and
   setting a value to be used to mark a segment as belonging to the background to white and a value to be used to mark a segment as belonging to a foreground to black when the background is darker than the content.

16. The system of claim 15, wherein the marking each pixel of the segment as belonging to a foreground or belonging to a background are performed by:
   marking all pixels of the segment as belonging to the background when the average and minimum luminance values of the segment are equal;
   marking the pixel as belonging to the background when the luminance of the pixel is greater than the average luminance of the segment; and
   marking the pixel as belonging to the fore when the luminance of the pixel is less than or equal to the average luminance of the segment.

17. The system of claim 10, wherein the determining includes:
   determining that the image is spam when the ratio of a number of horizontal edges to a number of vertical edges is greater than a threshold value.

18. The system of claim 17, wherein the threshold value is included in a range of approximately 10 to 15.

19. A computer program product for processing incoming email messages comprising:
   a non-transitory computer readable storage medium;
   computer program instructions, recorded on the computer readable storage medium, executable by a processor, for performing:
      processing an image included in or attached to an email message to determine whether the image includes features that indicate whether the image is spam;
      determining whether the image is spam based on the included features that indicate whether the image is spam; and detecting horizontal and vertical edges of contiguous regions as the features that indicate whether the image is spam, wherein a ratio of a number of horizontal edges to a number of vertical edges is used, at least in part, to determine whether the image is spam.

20. The computer program product of claim 19, wherein the processing includes:
converting the image to have luminance information; and
detecting contiguous horizontal regions with distinctive luminance.

21. The computer program product of claim 20, wherein the contiguous horizontal regions with distinctive luminance are detected by:
performing horizontal smoothening on the image; and
performing segmentation of the image.

22. The computer program product of claim 21, wherein the horizontal smoothening is performed by:
combining multiple pixels by setting each of the combined pixels to an average value of the combined pixels 23. The computer program product of claim 21, wherein the segmentation of the image is performed by:
computing an average luminance value of the image;
dividing each horizontal line in the image into a plurality of equal segments; and
for each segment of each horizontal line in the image:
determining an average and minimum luminance value of the segment, and
marking each pixel of the segment as belonging to a foreground or belonging to a background.

24. The computer program product of claim 23, wherein the determining an average and minimum luminance value of the segment are performed by:
determining that the background is brighter than a content when the average luminance value of the segment is greater than a threshold value and that the background is darker than the content when the average luminance value is less than or equal to the threshold value;
setting a value to be used to mark a segment as belonging to the background to black and a value to be used to mark a segment as belonging to a foreground to white when the background is brighter than the content; and
setting a value to be used to mark a segment as belonging to the background to white and a value to be used to mark a segment as belonging to a foreground to black when the background is darker than the content.

25. The computer program product of claim 24, wherein the marking each pixel of the segment as belonging to a foreground or belonging to a background are performed by:
marking all pixels of the segment as belonging to the background when the average and minimum luminance values of the segment are equal;
marking the pixel as belonging to the background when the luminance of the pixel is greater than the average luminance of the segment; and
marking the pixel as belonging to the fore when the luminance of the pixel is less than or equal to the average luminance of the segment.

26. The computer program product of claim 19, wherein the determining includes:
determining that the image is spam when the ratio of a number of horizontal edges to a number of vertical edges is greater than a threshold value.

27. The computer program product of claim 26, wherein the threshold value is included in a range of approximately 10 to 15.

* * * * *